United States Patent
Haskin

(10) Patent No.: US 11,570,292 B1
(45) Date of Patent: Jan. 31, 2023

(54) PROVIDING HANDS-FREE SERVICE TO MULTIPLE DEVICES

(71) Applicant: Amazon Technologies, Inc., Seattle, WA (US)

(72) Inventor: Menashe Haskin, Kfar Vitkin (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/833,531

(22) Filed: Mar. 28, 2020

Related U.S. Application Data

(63) Continuation of application No. 15/989,032, filed on May 24, 2018, now Pat. No. 10,609,199, which is a continuation of application No. 14/658,673, filed on Mar. 16, 2015, now Pat. No. 9,986,077, which is a continuation of application No. 13/626,624, filed on Sep. 25, 2012, now Pat. No. 8,983,383.

(51) Int. Cl.
*H04M 1/60* (2006.01)
*H04M 1/72412* (2021.01)

(52) U.S. Cl.
CPC ....... *H04M 1/6066* (2013.01); *H04M 1/6041* (2013.01); *H04M 1/72412* (2021.01); *H04M 2250/74* (2013.01)

(58) Field of Classification Search
None
See application file for complete search history.

(56) References Cited

U.S. PATENT DOCUMENTS

| | | |
|---|---|---|
| 5,905,956 A | 5/1999 | Young et al. |
| 7,418,392 B1 | 8/2008 | Mozer et al. |
| 7,720,683 B1 | 5/2010 | Vermeulen et al. |
| 7,774,204 B2 | 8/2010 | Mozer et al. |
| 7,986,914 B1 | 7/2011 | Henry, Jr. et al. |
| 8,983,383 B1 | 3/2015 | Haskin |
| 9,986,077 B1 | 5/2018 | Haskin |

(Continued)

FOREIGN PATENT DOCUMENTS

| | | |
|---|---|---|
| WO | WO2003015315 | 2/2003 |
| WO | WO2011088053 | 7/2011 |

OTHER PUBLICATIONS

Cisco, "Cisco Wireless Control System Configuration Guide", Software Release 3.2, Chapter 8, Mar. 2006, 11 pages.
(Continued)

*Primary Examiner* — Jianxun Yang
(74) *Attorney, Agent, or Firm* — Lee & Hayes, P.C.

(57) ABSTRACT

Techniques for providing audio services to multiple devices are described. For instance, connections between a hands-free unit and multiple wireless devices are established. The connections are themselves used to establish active communication channels, such as active audio communication channels, between the hands-free unit and the wireless devices, such as during a phone call. Upon establishment of an active communication channel with one of the wireless devices, the connections to the other wireless devices are disconnected—and/or additional connections refused—for the duration of the active communication channel. Furthermore, a routing module in various embodiments permits multiple hands-free units to route active communication channels to each other depending on user location.

20 Claims, 4 Drawing Sheets

(56) References Cited

U.S. PATENT DOCUMENTS

| | | | |
|---|---|---|---|
| 2003/0045279 A1 | 3/2003 | Shostak | |
| 2003/0118200 A1 | 6/2003 | Beaucoup et al. | |
| 2005/0014487 A1 | 1/2005 | Kobayashi et al. | |
| 2007/0116227 A1* | 5/2007 | Vitenson | H04M 3/4878 379/207.02 |
| 2008/0051156 A1 | 2/2008 | Matsuda | |
| 2009/0286534 A1 | 11/2009 | Garg et al. | |
| 2010/0118112 A1 | 5/2010 | Nimri et al. | |
| 2010/0142682 A1 | 6/2010 | Baum | |
| 2010/0312547 A1 | 12/2010 | Van Os et al. | |
| 2010/0324890 A1 | 12/2010 | Adeney | |
| 2011/0044474 A1* | 2/2011 | Grover | H04R 27/00 381/107 |
| 2012/0036441 A1* | 2/2012 | Basir | H04M 1/642 715/734 |
| 2012/0177029 A1 | 7/2012 | Hillier et al. | |
| 2012/0206553 A1* | 8/2012 | MacDonald | G06K 9/00288 348/14.01 |
| 2012/0223885 A1 | 9/2012 | Perez | |

OTHER PUBLICATIONS

Office action for U.S. Appl. No. 14/658,673 dated Oct. 1, 2015, Haskin, "Providing Hands-Free Service to Multiple Devices", 20 pages.

Office action for U.S. Appl. No. 14/658,673, dated Nov. 3, 2016, Haskin, "Providing Hands-Free Service to Multiple Devices", 19 pages.

Office Action for U.S. Appl. No. 15/989,032, dated Apr. 19, 2019, Haskin, "Providing Hands-Free Service to Multiple Devices", 12 pages.

Office Action for U.S. Appl. No. 14/658,673, dated Jun. 17, 2015, Menashe Haskin, "Providing Hands-Free Service to Multiple Devices", 9 pages.

Office action for U.S. Appl. No. 14/658,673 dated Jun. 22, 2017, Haskin, "Providing Hands-Free Service to Multiple Devices", 19 pages.

Office Action for U.S. Appl. No. 13/626,624, dated Jun. 4, 2014, Menashe Haskin, "Providing Hands-Free Service to Multiple Devices", 24 pages.

Office action for U.S. Appl. No. 14/658,673, dated Jun. 7, 2016, Haskin, "Providing Hands-Free Service to Muitipie Devices", 21 pages.

Office Action for U.S. Appl. No. 15/989,032, dated Aug. 29, 2019, Haskin, "Providing Hands-Free Service to Multiple Devices", 6 pages.

Panasonic, "Panasonic Operating Instructions, Link-to-Cell Cellular Convergence Solutions Model No. KX-TG6582, KX-TG6583". 2010, 88 pages.

Pinhanez, "The Everywhere Displays Projector: A Device to Create Ubiquitous Graphical Interfaces", IBM Thomas Watson Research Center, Ubicomp 2001, 18 pages.

Wikipedia, "Friis Transmission Equation", Retrieved from <<https://web.archive.org/web/20120529125026/http://en.wikipedia.org/wiki/ Friis_transmittions_equation>>, May 2012, 3 pages.

* cited by examiner

PROVIDING HANDS-FREE SERVICE TO MULTIPLE DEVICES

CROSS-REFERENCE TO RELATED APPLICATIONS

This application is a continuation of and claims priority to U.S. application Ser. No. 15/989,032, filed May 24, 2018, entitled "Providing Hands-Free Service to Multiple Devices," which is a continuation of and claims priority to U.S. application Ser. No. 14/658,673, filed Mar. 16, 2015, entitled "Providing Hands-Free Service to Multiple Devices," now U.S. Pat. No. 9,986,077, which is a continuation of and claims priority to U.S. application Ser. No. 13/626,624, filed on Sep. 25, 2012 entitled "Providing Hands-Free Service to Multiple Devices," now U.S. Pat. No. 8,983,383, all of which are hereby incorporated in their entireties by reference.

BACKGROUND

Conventional hands-free operation for mobile phones, such as is described in the Bluetooth Hands-Free Profile Specification, utilizes a hands-free service connection between the Audio Gateway (AG) (e.g., the mobile phone) and the hands-free (HF) unit to provide hands-free operation to a user. When the mobile phone receives a phone call, or when the user initiates a call via the HF unit, the AG and the HF utilize the hands-free service connection to establish an audio communication channel between the AG and HF. A microphone and speaker of the HF unit operate in place of the mobile phone's microphone and speaker for the duration of the call. Thus, a user can speak into the HF's microphone and listen to call audio via the HF's speaker.

Traditional HF units support an active audio communication channel for a single mobile phone at any one time. Otherwise, the microphone and speaker would be used to carry more than one voice call, thereby resulting in user confusion. This is generally acceptable, since users can tell that the HF unit is active with another mobile phone and therefore do not expect that their calls will be accepted by the HF unit.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
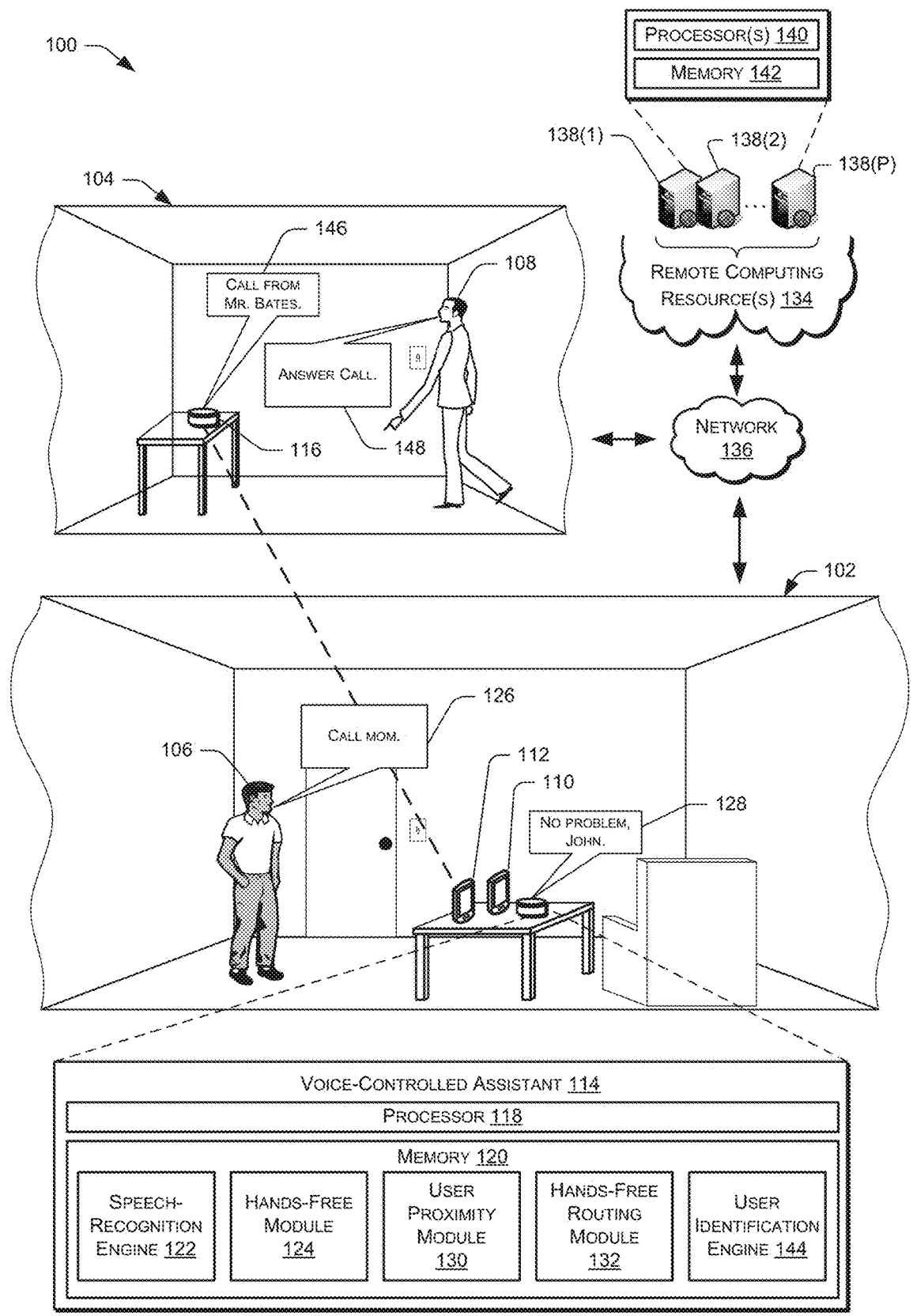
FIG. 1 shows an illustrative voice interactive computing architecture set in a home environment and providing a hands-free service.

This disclosure describes, in part, techniques for enabling multiple mobile phones to receive hands-free service from multiple hands-free units. As described below, hands-free units are associated, paired or bonded with multiple mobile phones. The hands-free units are able to establish control connections to multiple associated/paired/bonded mobile phones that come within wireless range of the hands-free units. The control connections enable various hands-free functions, such as initiating phone calls, answering calls, adjusting a ringer, searching in a directory, and so forth. When one of the mobile phones becomes active—that is, when one of the mobile phones receives or initiates a phone call—the hands-free unit establishes an audio communication channel and makes its speaker and microphone available to provide phone audio output and input on behalf of the mobile phone. In conventional operation, the other mobile phones would retain their control connections to the hands-free unit, but the hands-free unit is unable to handle phone calls for the other connected mobile phones. In various embodiments of the present disclosure, the hands-free unit disconnects the control connections from the other mobile phones and permits no new control connections during the active phone call. In this way, the other mobile phones are freed up and able to establish control connections to any other associated/paired/bonded hands-free unit that is within range of the mobile phones.

In one aspect of the present disclosure, hands-free units form a portion of an electronic voice-controlled assistant that is part of a voice interaction computing architecture. The user may interact with the voice-controlled assistant to perform various functions. For example, once the user's mobile phone or other device establishes a control connection to the voice-controlled assistant for hands-free service, the user may utilize voice commands to the assistant to initiate phone calls through the mobile phone, answer phone calls received on the mobile phone, search the mobile phone's directory, and so forth. The voice interaction computing architecture may include multiple interconnected voice-controlled assistants, each with its own speaker and microphone, located at different locations within a house, apartment, dormitory, office, factory, campus, warehouse, other building or other localized geographic area. The user may set his or her phone down near one voice-controlled assistant and then wander over to an area proximal to another voice-controlled assistant. The voice interaction computing architecture is configured to determine that a user is proximal to a particular voice-controlled electronic assistant, recognize an identity of the user (using for example voice or facial recognition), and to route the user's active phone calls to the electronic voice-controlled assistant nearest the user.

Thus, in one example, a first user's mobile phone and a second user's mobile phone may both be paired with and establish control connections with an electronic voice-controlled assistant in the first room. At some point, the first user's mobile phone may receive a phone call and establish an active audio communication channel with the first electronic voice controlled assistant in a first room. At this point, the first electronic voice-controlled assistant disconnects the control connection to the second user's mobile phone.

While the first user may be initially present in the first room, utilizing the speaker and microphone of the first electronic voice-controlled assistant for hands-free operation, the first user may move to a second room during the course of the phone call and begin using a speaker and microphone of a second electronic voice-controlled assistant in the second room for hands-free operation. This may be accomplished by one or both of the electronic voice-controlled assistants determining the location or proximity of the first user in the second room and the first voice-controlled assistant routing the audio communication channel and/or the hands-free control connection to the second voice-controlled assistant based on the first user's location or proximity.

Continuing with the above example, the second user may be present in the first room while the first user is in the second room, and the second user may expect to be able to utilize the hands-free capabilities of the first room. As noted above, the first electronic voice-controlled assistant disconnects the control connection to the second mobile phone at the onset of the phone call for the first user's mobile phone. The first electronic voice-controlled assistant also denies any subsequent control connection requests from the second user's phone for the duration of the first user's call. This frees up the second user's mobile phone to establish a control connection to, for example, the second electronic voice controlled assistant for hands-free operation. Upon establishing a control connection to the second electronic voice-controlled assistant, one or both of the two electronic voice-controlled assistants determines that the second user is present in or proximal to the first room, and upon receiving or initiating a phone call for the second user's mobile phone, the second electronic voice-controlled assistant routes the audio communication channel and/or the control connection to the first voice-controlled assistant to provide hands-free operation to the second user while the second user is present in the first room. Were the first electronic voice controlled assistant not to disconnect the control connection to the second user's mobile phone at the onset of a phone call for the first user's mobile phone, then the second user's mobile phone would not establish a control connection to another hands-free unit, and the second user may be frustrated by the fact that he or she is unable to access the seemingly available (but in fact unavailable) hands-free unit of the first room.

Thus, various embodiments of the present disclosure allow a voice interaction computing architecture to provide hands-free operation to a user when the user and his or her phone is not in the same room. Also, various embodiments of the present disclosure allow a voice interaction computing architecture to provide hands-free operation to multiple users when their respective mobile phones are initially paired with and/or have control connections established with the same hands-free unit.

The techniques described herein reference hands-free services provided by a voice interaction computing architecture. The techniques, however, also apply to hands-free headsets, automotive hands-free units, and other hands-free devices and systems. Furthermore, the devices and techniques described above may be implemented in a variety of different architectures and contexts. One non-limiting and illustrative implementation is described below.

Illustrative Environment

FIG. 1 shows an illustrative voice interactive computing architecture 100 set in a home environment and providing a hands-free service. The home environment includes a living room 102 and an office 104. A user 106 is in the living room 102 while a user 108 is in the office 104. On the table in the living room 102 are wireless devices 110 and 112. The wireless devices 110 and 112 may represent mobile phones, smart phones, tablet computers, personal computers, personal data assistants, media players, laptop computers, netbooks or other devices capable of implementing a wireless network.

As illustrated, the living room includes an electronic voice-controlled assistant 114, which may provide a hands-free unit capable of coupling to one or more mobile phones in proximity to the assistant 114. In addition, the office 104 includes another electronic voice-controlled assistant 116, which may also provide a hands-free unit.

The users 106 and 108 may interact with the electronic voice-controlled assistants 114 and 116 using voice commands. In the illustrated implementation, the voice-controlled assistants 114 and 116 are positioned on tables. In other implementations, they may be placed in any number of locations (e.g., ceiling, wall, in a lamp, beneath a table, under a chair, etc.). Further, more than one assistant may be positioned in a single room. In the following description, capabilities of the voice-controlled assistant 114 will be discussed. However, it is noted that the capabilities of the voice-controlled assistant 116 may be the same as or similar to the capabilities of the voice-controlled assistant 114.

Generally, the voice-controlled assistant 114 has at least one microphone and at least one speaker to facilitate audio interactions with the user 106. One example implementation of the voice-controlled assistant 114 is provided below in more detail with reference to FIG. 2.

As illustrated, the voice-controlled assistant 114 includes a processor 118 and memory 120, which stores or otherwise has access to a speech-recognition engine 122. As used herein, a processor may include multiple processors and/or a processor having multiple cores. The speech-recognition engine 122 performs speech recognition on audio captured by the microphone, such as utterances spoken by the user 106. The voice-controlled assistant 114 may perform certain actions in response to recognizing different speech from the user 106. The user may speak predefined commands (e.g., "Awake"; "Sleep"), or may use a more casual conversation style when interacting with the assistant 114 (e.g., "I'd like to go to a movie. Please tell me what's playing at the local cinema.").

The hands-free module 124 may provide a hands-free service (e.g., according to the Bluetooth Hands-Free Profile or other hands-free service type) to the wireless devices 110 and 112, as well as to other wireless devices that may be associated with the voice-controlled assistant 114 and within range. For example, the wireless devices 110 and 112 may be paired and bonded with the voice-controlled assistant 114, such as by manually entering a passkey or by automatic operation, depending on the application. Once paired and bonded, the wireless devices 110 and 112 discover the voice-controlled assistant 114, recognize that they are paired with the voice-controlled assistant 114, and set up control connections between the wireless devices 110 and 112 and the voice-controlled assistant 114. The control connections may utilize various wireless protocols and standards, such as various personal area network (PAN) standards and protocols including, for example, Bluetooth, various IEEE 802.15 specifications, and so forth. The control connections may be hands-free service connections, which enable the voice-controlled assistant 114 to provide hands-free services to the wireless device 110 and 112. For example, the hands-free module 124 may provide various functions, based for example on voice commands spoken by the user. These various functions include for example, looking up a number in a mobile phone directory, dialing a number, speaking an identity of a an incoming caller, raising the ring volume, turning off the phone, and so forth.

In response to an active phone call, either received or initiated by the wireless devices 110 and 112, the voice-controlled assistant 114 establishes an audio communication channel between the active mobile phone and the voice-controlled assistant 114. The microphone and speaker of the voice-controlled assistant 114 will then be used in place of the wireless devices' microphones and speakers for the duration of the call.

The voice-controlled assistant 114 may initially be paired with and have control connections established to both wireless device 110 and to wireless device 112. The user 106 issues a voice command 126 to instruct the voice assistant 114 to place a call to "mom." The electronic voice-controlled assistant 114 may cause an affirmation audio 128 to play on a microphone to inform the user 106 that the command will be carried out. The hands-free module 124 causes an audio communication channel to be established the wireless device 110, via the hands-free control connection, and the call is placed. The audio communication channel is used to transmit audio samples (compressed or uncompressed), including voice audio samples, in various formats and using various data protocols, including various voice-over Internet Protocol (VOIP) protocols, technologies methodologies, and transmission techniques; alternatively other packetized or non-packetized voice data protocols, technologies methodologies, and transmission techniques may be utilized. Were the voice-controlled assistant 114 to operate as a conventional hands-free unit, the wireless device 112 would remain connected to the voice-controlled assistant 114. Because of this, the wireless device 112 would be unable to place or receive any phone calls using hands-free operation.

In this instance, however, the voice-controlled assistant 114 disconnects the control connection to the wireless device 112 responsive to the active phone call, and refuses any subsequent control connections from the wireless device 112 or any other wireless device that comes within range for the duration of the call. This frees up the wireless device 112 to establish a control connection to any other hands-free units to which the device 112 may be pair/bond with. Once the active phone call ends, and the audio communication channel is dropped, the voice-controlled assistant 114 is free to establish one or more control connections, such as hands-free service connections, to the wireless device 112 and any other wireless devices that may be present in the home environment of FIG. 1. In the example shown in FIG. 1, the wireless device 112 pairs with the voice-controlled assistant 116 and establishes a control connection to it after being disconnected from the voice-controlled assistant 114. Thus, the user 108 may utilize the hands-free capabilities of the voice-controlled assistant 116 to place or accept telephone calls.

The users 106 and 108 may wander around the home environment while still utilizing the hands-free services of the voice-controlled assistants 114 and 116. For example, the user 106 may leave the living room 102 and later enter the office 104 either before or during an active phone call. The user 106 may either leave the wireless device 110 in the living room 102 or the user 106 may take the wireless device 110 with him to the office 104. In either event, the wireless device 110 remains connected to the voice-controlled assistant 114 in the living room 102. A user proximity module in the voice-controlled assistant 116 may determine that the user 106 is proximal or relatively near to the voice-controlled assistant 116—such as by face or voice recognition— and inform the user proximity module 130 in the voice-controlled assistant 114 of the user's proximity. Alternatively, or in addition, the user proximity module 130 in the voice-controlled assistant 114 may accept input from the user proximity module of the voice-controlled assistant 116 to determine the user's proximity. For example, the proximity module 130 in the voice-controlled assistant 114 may receive a signal strength of an audio sample spoken by the user 106 captured by the voice-controlled assistant 116 in the office 104 and compare it to an audio sample spoken by the user 106 captured by the voice-controlled assistant 114 in the living room 102 to determine a relative proximity, or to determine which voice-controlled assistant the user is relatively closer to.

Other embodiments may utilize techniques that utilize something other than signal strength of an audio sample to determine a location or proximity of the user 106. In some embodiments, Time Difference of Arrival (TDOA) techniques may be utilized. For example, both the voice-controlled assistant 114 and the voice-controlled assistant 116 may determine that they received the same audio sample spoken by the user 106, and compare the times that they received the audio samples. Whichever voice-controlled assistant received the audio sample first is deemed to be closer to the user 106. In other embodiments, one of various beamforming techniques may be utilized to detect the user's location based on voice recognition or other sounds produced by the user 106.

In alternative embodiments, the location of wireless devices 110 and 112 may be used to determine the location of users 106 and 108. This would work, for example, in situations where the users 106 and 108 carry their respective wireless devices with them as they move about the environment. The wireless devices 110 and 112 may include a location service, such as a Global Positioning System (GPS) location service, Wi-Fi location service, cell phone tower triangulation service, audio capture, or other location service. Location information from the location service is provided to the user proximity module 130 via, for example, the control connection, and the user proximity module 130 utilizes the provided location information to locate the user and determine the electronic voice-controlled assistant that is closest to, or that is otherwise appropriate for, the user.

Based on user proximity, the hands-free routing module 132 may route audio communication channels and/or control connections to, and receive routed audio communication channels and/or control connections from, other voice-controlled assistants. In the example shown in FIG. 1, the user 106 may enter the office 104 while his wireless device 110 remains connected to the voice-controlled assistant 114. The hands-free routing module 132 receives indication that the user 108 is proximate to or located relatively near to the voice-controlled assistant 116, and routes the audio communication channel and the control connection from the wireless device 110 to the voice-controlled assistant 116 in the office 104. In this way, the voice-controlled assistant 116 may play received audio on its speaker and record the user's spoken conversation on its microphone.

Similarly, the hands-free routing module 132 receives an active audio communication channel from the voice-controlled assistant 116 in the office 104, such as for example after it is determined that the user 108 has moved and is now proximate to or located relatively nearer to the voice-controlled assistant 114 than to the voice-controlled assistant 116. The hands-free routing module 132 or the user proximity module 130 may first transmit a message to the voice-controlled assistant 116 indicating that the user is proximal to the voice-controlled assistant 114.

In some instances, the voice-controlled assistant 114 may operate in conjunction with or may otherwise utilize computing resources 134 that are remote from the home environment. For instance, the voice-controlled assistant 114 may couple to the remote computing resources 134 over a network 136. As illustrated, the remote computing resources 134 may be implemented as one or more servers 138(1), 138(2), . . . , 138(P) and may, in some instances form a portion of a network-accessible computing platform implemented as a computing infrastructure of processors, storage, software, data access, and so forth that is maintained and accessible via a network such as the Internet. The remote computing resources 134 do not require end-user knowledge of the physical location and configuration of the system that delivers the services. Common expressions associated for these remote computing resources 134 include "on-demand computing", "software as a service (SaaS)", "platform computing", "network-accessible platform", "cloud services", "data centers", and so forth.

The servers 138(1)-(P) include processor(s) 140 and memory 142, which may store or otherwise have access to some or all of the components described with reference to the memory 120 of the voice-controlled assistant 114. For instance, the memory 142 may have access to and utilize the speech-recognition engine 122 for receiving audio signals from the assistant 114, recognizing speech and, potentially, causing performance of an action in response. In some examples, the voice-controlled assistant 114 may upload audio data to the remote computing resources 134 for processing, given that the remote computing resources 134 may have a computational capacity that exceeds the computational capacity of the voice-controlled assistant 114. Therefore, the voice-controlled assistant 114 may utilize the speech-recognition engine 122 at the remote computing resources 134 for performing relatively complex analysis on audio captured from the home environment.

As illustrated, the memory 120 of the voice-controlled assistant 114 also stores or otherwise has access to a user identification engine 144. The user identification engine 144 functions to identify a user, such as a user that utters an audible command with reference to an audio signature associated with the utterance and, potentially, with reference to one or more other characteristics associated with the utterance.

The user proximity module 130 may operate in conjunction with the user identification engine 144 to identify a user and determine the user's relative location and/or proximity to the voice-controlled assistant 114. For example, the user identification engine 144 may determine the identity of the user 108 after the user 108 enters the living room 102 and inform the user proximity module 130 that there is a new user in the living room 102. At that point, the user proximity module 130 may transmit a message to the voice-controlled assistant 116 informing it of the user 108 presence in the living room 102. The hands-free routing module 132 may then cooperate with a hands-free routing module of the voice-controlled assistant 116 to route the user's 108 active phone call to the voice-controlled assistant 114. In this example, the user 108 leaves the wireless device 112 in the living room 102. But the same or similar process may occur were a location service within the wireless device 112 used to provide location information to the user proximity module 130. In these embodiments, the location of the wireless devices 110 and 112 are used as proxies for the users' locations.

Referring back to the user identification engine 144, upon the voice-controlled assistant 114 capturing audio with its microphone(s), the user identification engine 144 may compare the audio to user profile(s), each of which is associated with a respective user. Each user profile may store an indication of an audio signature associated with the respective user based on previous voice interactions between the respective user and the voice-controlled assistant 114, other voice-controlled assistants, or other voice-enabled devices or applications.

In addition, each of the profiles may indicate one or more other characteristics learned from previous interactions between the respective user and the voice-controlled assistant 114, other voice-controlled assistants, or other voice-enabled devices or applications. For instance, these characteristics may include:

commands often or previously issued by the respective user;
grammar typically used by the respective user;
a vocabulary typically used by the respective user;
content to which the respective user has access and/or content that the respective user often requests;
a schedule associated with the respective user, either learned over time or determined with reference to a calendaring application associated with the respective user;
third-party services that the respective user has registered with (e.g., music services, shopping services, email account services, etc.);
days on which the respective user often issues voice commands or is otherwise present in the environment;
times of day at which the respective user often issues voice commands or is otherwise present in the environment;
a location of the respective user when the voice-controlled assistant 114 captures the audio (e.g., obtained via a GPS location of a client device associated with the user);
previous interactions between the respective user and the voice-controlled assistant 114, other voice-controlled assistants, or other voice-enabled devices or applications;
background noise that commonly exists when the respective user interacts with the voice-controlled assistant 114 (e.g., certain audio files, videos, television shows, cooking sounds, etc.).

Of course, while a few examples have been listed, it is to be appreciated that the techniques may utilize multiple other similar or different characteristics when attempting to identify the user 106 or 108 that utters a command. In various embodiments, identification of the user 106 or 108 aids in determining the location or proximity of the user 106 or 108, thereby allowing the voice-controlled assistants 114 and 116 to route audio calls and/or control connections between them to provide hands-free operation to the users 106 and 108 based on their location within the environment.

Also, upon detecting sound within the home environment, such as by a microphone of the electronic voice-controlled assistants 114 and 116, the speech-recognition engine 122 may first attempt to identify whether or not the sound contains speech, such as speech from the user 106 or 108. If so, then the speech-recognition engine 122 may perform automatic speech recognition (ASR) on the speech, and may perform an action corresponding to any command from the speech. For example, as shown in FIG. 1, upon detecting a voice call received on the wireless device 112, the electronic voice-controlled assistant 116 plays audio 146 to inform the user 108 that a phone call is received. The user 108 then utters command 148 to instruct the electronic voice-controlled assistant 116 to answer the call. (Similarly, the user 108 may issue a command to ignore the call, forward the call to voicemail or perform some other action.) Upon detecting the sound caused by the user's 108 utterance, the speech-recognition engine identifies the utterance as speech and performs ASR on the utterance to determine the command 148 ("answer call") and act to facilitate answering the phone call, such as via the control connection to the wireless device 108.

In addition, the techniques apply to other applications other than providing hands-free service to users. For example, audio communication channels established between wireless devices 110 and 112 and the electronic voice-controlled assistants 114 and 116 could be used to play media audio, such as where the wireless device includes a media player module. In such embodiments, a control connection could be established to control the media player module on the wireless device, such as via audio commands similar to the embodiments described herein with respect to providing hands-free service. For example, a user may issue verbal commands such as "play", "stop", "pause", "fast forward", "rewind", advance track" or other commands. The location of the users 106 and 108 can be tracked as is described herein, and the media audio can be played on the speaker/voice-controlled assistant that is located nearest the user.

An active phone call may interrupt other functions of the wireless devices 110 and 112, such as media streaming functions. Thus, the wireless devices 110 and 112 may transition from streaming media content, to providing an audio communication channel for a phone call, and then revert back to streaming the media content when the phone call ends. If the user moves locations during the audio call, the voice-controlled assistants 114 and 116 may route the audio communication channel for the voice call as described herein. Upon reverting to streaming the media content after the call ends, the media content may be streamed to the voice-controlled assistant that is nearest to the user. As such, the user receives the streamed media content at his or her new post-call location even though the user may have received the streamed media content at another voice-controlled assistant before the call began.

Illustrative Voice-Controlled Assistant

Figure 2:
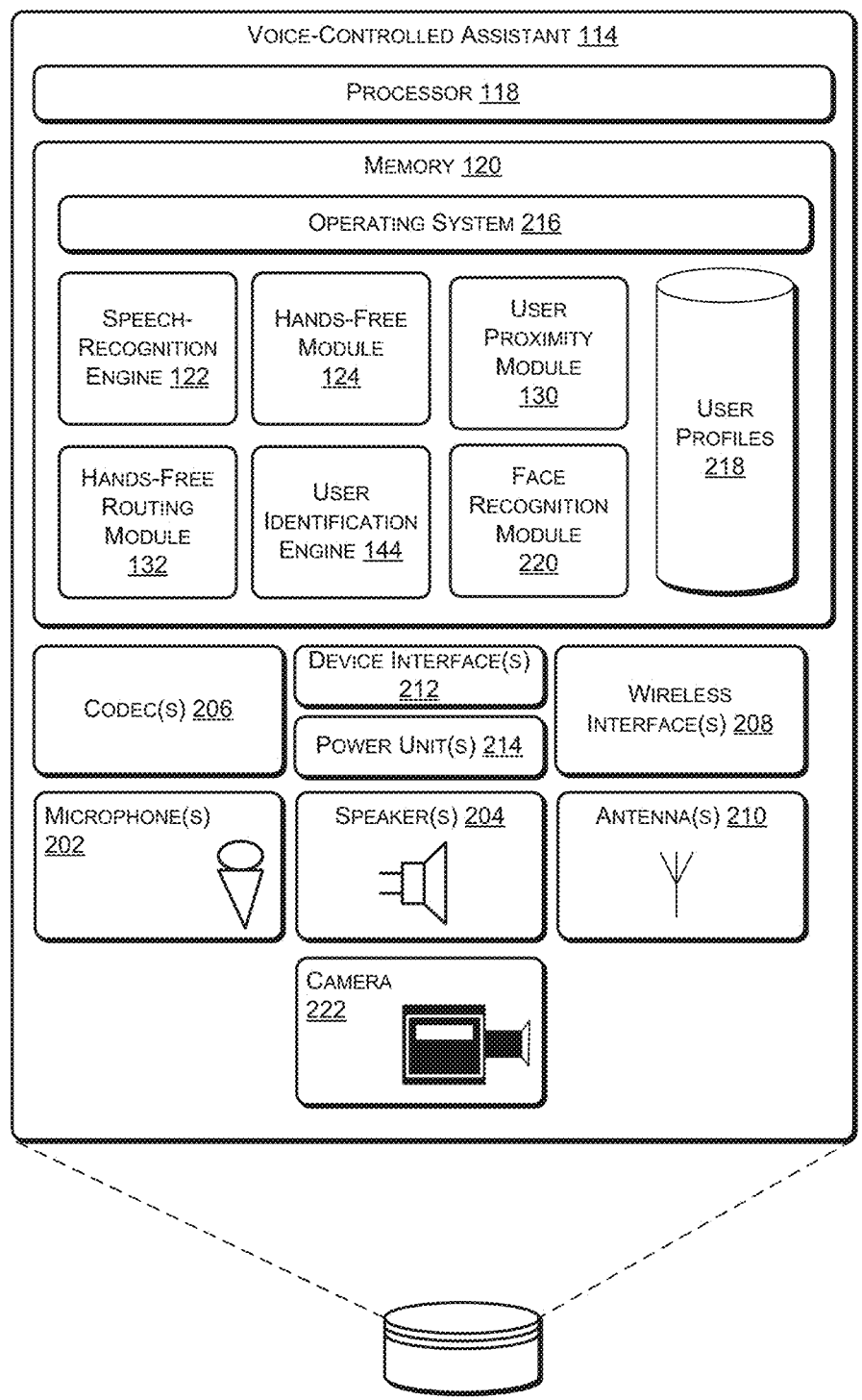
FIG. 2 shows a block diagram of selected functional components implemented in the voice-controlled assistant of FIG. 1.

FIG. 2 shows selected functional components of the voice-controlled assistant 114 in more detail. Generally, the voice-controlled assistant 114 may be implemented as a standalone device that is relatively simple in terms of functional capabilities with limited input/output components, memory and processing capabilities. For instance, the voice-controlled assistant 114 may not have a keyboard, keypad, or other form of mechanical input in some implementations, nor does it have a display or touch screen to facilitate visual presentation and user touch input. Instead, the assistant 114 may be implemented with the ability to receive and output audio, a network interface (wireless or wire-based), power, and limited processing/memory capabilities.

In the illustrated implementation, the voice-controlled assistant 114 includes the processor 118 and memory 120. The memory 120 may include computer-readable storage media ("CRSM"), which may be any available physical media accessible by the processor 118 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 118.

The voice-controlled assistant 114 includes one or more microphones 202 to receive audio input, such as user voice input, and one or more speakers 204 to output audio sounds. Codec(s) 206 are coupled to the microphone 202 and speaker 204 to encode and/or decode the audio signals. The codec may convert audio data between analog and digital formats. A user may interact with the assistant 114 by speaking to it, and the microphone 202 captures the user speech. The codec(s) 206 encode the user speech and transfers that audio data to other components. The assistant 114 can communicate back to the user by emitting audible statements through the speaker 204. In this manner, the user interacts with the voice-controlled assistant simply through speech, without use of a keyboard or display common to other types of devices.

In the illustrated example, the voice-controlled assistant 114 includes one or more wireless interface(s) 208 coupled to antenna(s) 210 to facilitate a wireless connection to a network, and to facilitate audio communication channels and/or control connections to one or more wireless devices in order to provide hands-free service to them. The wireless interface(s) 208 may implement one or more of various wireless technologies, such as wifi, Bluetooth, RF, and so on.

Device interface(s) 212 may further be provided as part of the assistant 114 to facilitate a wired connection to a network, or a plug-in network device that communicates with other wireless networks. In addition to the device interface(s) 212, or as an alternative thereto, other forms of wired connections may be employed, such as a broadband connection. Power unit(s) 214 are further provided to distribute power to the various components on the assistant 114.

The voice-controlled assistant 114 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the voice-controlled assistant 114 may include non-input control mechanisms, such as basic volume control button(s) for increasing/decreasing volume, as well as power and reset buttons. There may also be a simple light element (e.g., LED) to indicate a state such as, for example, when power is on. But, otherwise, the assistant 114 does not use or need to use any input devices or displays in some instances.

Several modules such as instruction, datastores, and so forth may be stored within the memory 120 and configured to execute on the processor 118. An operating system module 216 is configured to manage hardware and services (e.g., wireless interface(s), device interface(s), Codec(s)) within and coupled to the assistant 114 for the benefit of other modules.

In addition, the memory 120 may include the speech-recognition engine 122, the user identification engine 144, and user profiles 218, discussed above. The memory 120 may also include the hands-free module 124, the user proximity module 130, the hands-free routing module 132, and the user-identification engine 144, discussed above. In addition, the memory 120 may include a face recognition module 220 configured to identify a user based on face recognition. For example, the face recognition module may receive an image of a user captured by a camera 222 of the voice-controlled assistant and to compare the captured image to user image data stored, for example, in the user profiles 218, to determine an identity of the user. The identity of the user via face recognition may be used as an alternative to, or in conjunction with, the voice recognition discussed above to identify the user and determine the user's location or proximity. Also as discussed above, some or all of these engines, data stores, and components may reside additionally or alternatively at the remote computing resources 134.

Illustrative Processes

Figure 3:
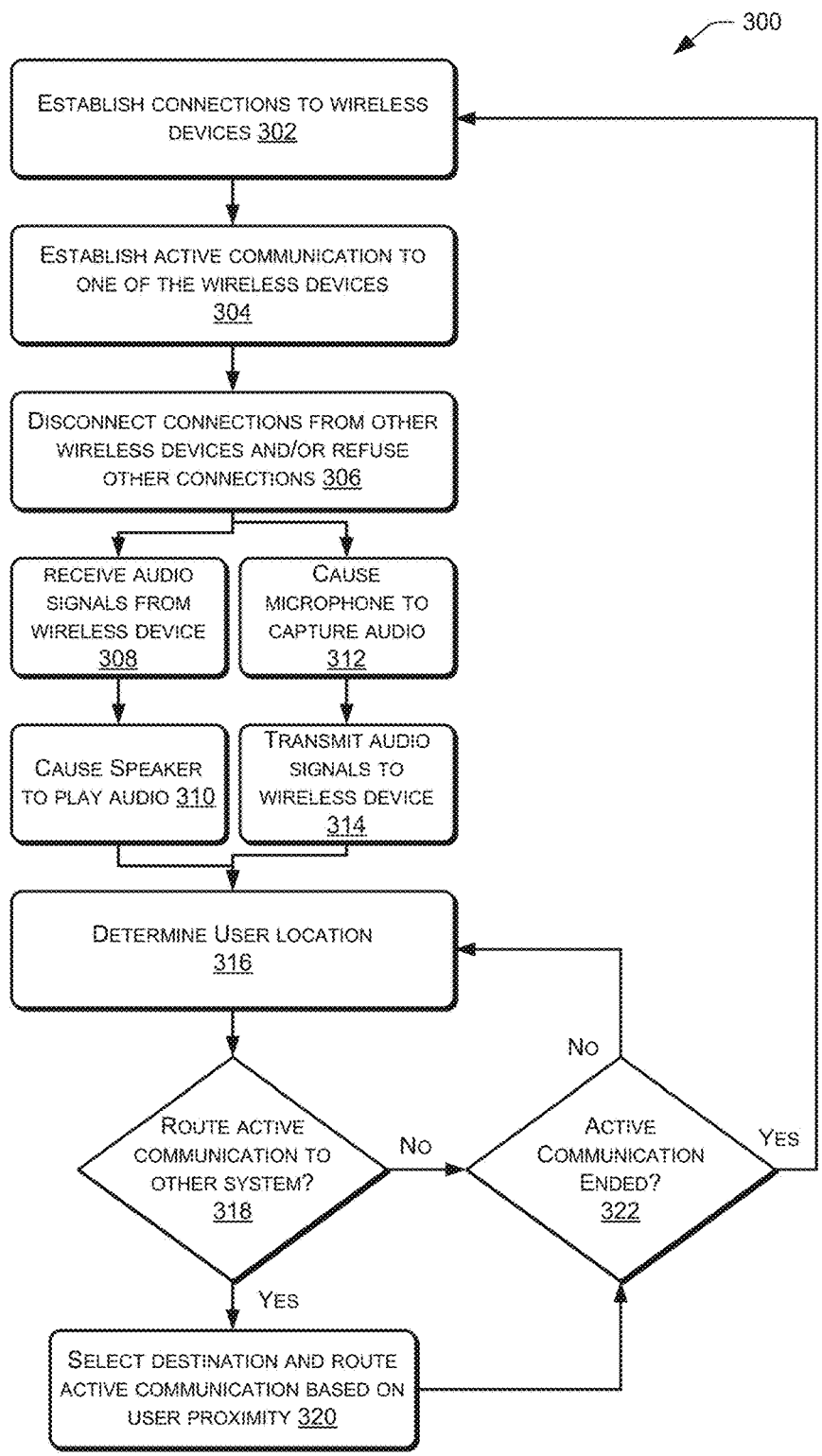
FIG. 3 depicts a flow diagram of an example process for providing hands-free service to multiple devices.

FIG. 3 depicts a flow diagram of an example process 300 for providing hands-free service to multiple devices. The process 300 is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 302, a hands-free module of a hands-free device, such as the hands-free module 124 of the voice-controlled assistant 114, establishes a first control connection to a first wireless device (such as the wireless device 110) and a second control connection to a second wireless device (such as the wireless device 112). The first control connection and the second control connection enable establishment of active communication channels to the first wireless device and the second wireless device. In various embodiments, the first and second control connections are hands-free service connections, such as is described by the Bluetooth Hands-Free Profile. In these instances, the first wireless device and the second wireless device are Bluetooth audio gateways and the wireless system includes a Bluetooth Hands-Free Profile capability.

At 304, the hands-free module establishes active communication channel to the first wireless device based at least in part on the first control connection. In other words, the hands-free module utilizes the first control connection to transmit messages to establish the active communication channel. The active communication channel may be an audio communication channel or some other connection type.

At 306, the hands-free module disconnects the second control connection to the second wireless device in response to establishment of the active communication with the first wireless device. Alternatively or in addition, the hands-free module refuses control connections from the second wireless device or other proximate wireless devices for the duration of the call. This enables the second wireless device to establish a control connection to another device to receive hands-free service for at least the duration of the phone call.

At 308, the hands-free module receives audio signals from the first wireless device via the active communication channel.

At 310, the hands-free module causes a speaker to play the sounds received from the first wireless device. This audio is the voice and other sounds provided by the user's mobile phone via the audio communication channel. These voice sounds may be from the other caller that the user is speaking to via their wireless device, and are therefore played on the speaker as part of the hands-free operation.

At 312, the hands-free module causes a microphone to capture audio signals from the environment, such as utterances spoken by the user. The utterances spoken captured by the microphone are treated as audio that is to be transmitted by the mobile phone to the other caller.

At 314, the hands-free module transmits the audio signals captured by the microphone to the first wireless device via the active communication channel.

At 316, a user proximity module, such as the user proximity module 130, determines a location of the user based, for example, on voice recognition or face recognition. In alternative embodiments, a location of the user's phone is tracked to determine the user's location, such as by a global positioning system (GPS) location service, a Wi-Fi location service, a cell phone location triangulation service, audio capture, or in other ways. In various embodiments, the proximity module may receive indication from another proximity module of another voice-controlled assistant that the user is located near or proximate to the other voice-controlled assistant. In various embodiments, the proximity module may compare signal strength of an audio sample captured by the other user proximity module to signal strength of an audio sample captured by the voice-controlled assistant to determine which voice-controlled assistant is closest to the user. In various embodiments, the capabilities of a speech-recognition engine, a face recognition module, and a user identification module may assist in locating and identifying the user.

At 318, a hands-free routing module determines whether to route the active communication channel to another hands-free device, such as another voice-controlled assistant. The determination to route the active communication channel may be based on, for example, whether the user associated with the wireless device is located near, or relatively nearer to, another hands-free device.

At 320, upon a determination to route the active communication channel to another hands-free device, the hands-free routing module selects a hands-free device and routes the active communication channel to it. In various embodiments, a speaker or a microphone of the hands-free routing module may be located at a different location than the hands-free device itself. In these instances, the hands-free routing module may select a particular speaker and/or microphone to utilize for the active communication channel, whether the selected microphone and/or speaker are controlled directly by the hands-free unit or by another hands-free unit.

At 322, upon ending the active communication channel with the wireless device, the hands-free device is freed up to establish and/or re-establish control connections with other paired wireless devices within range. As long as the phone call remains active, the user proximity module continues to track and/or determine the user's location and to cause the audio communication channel to be routed based on the user's location as it changes.

Illustrative Voice Re-Routing

Figure 4:
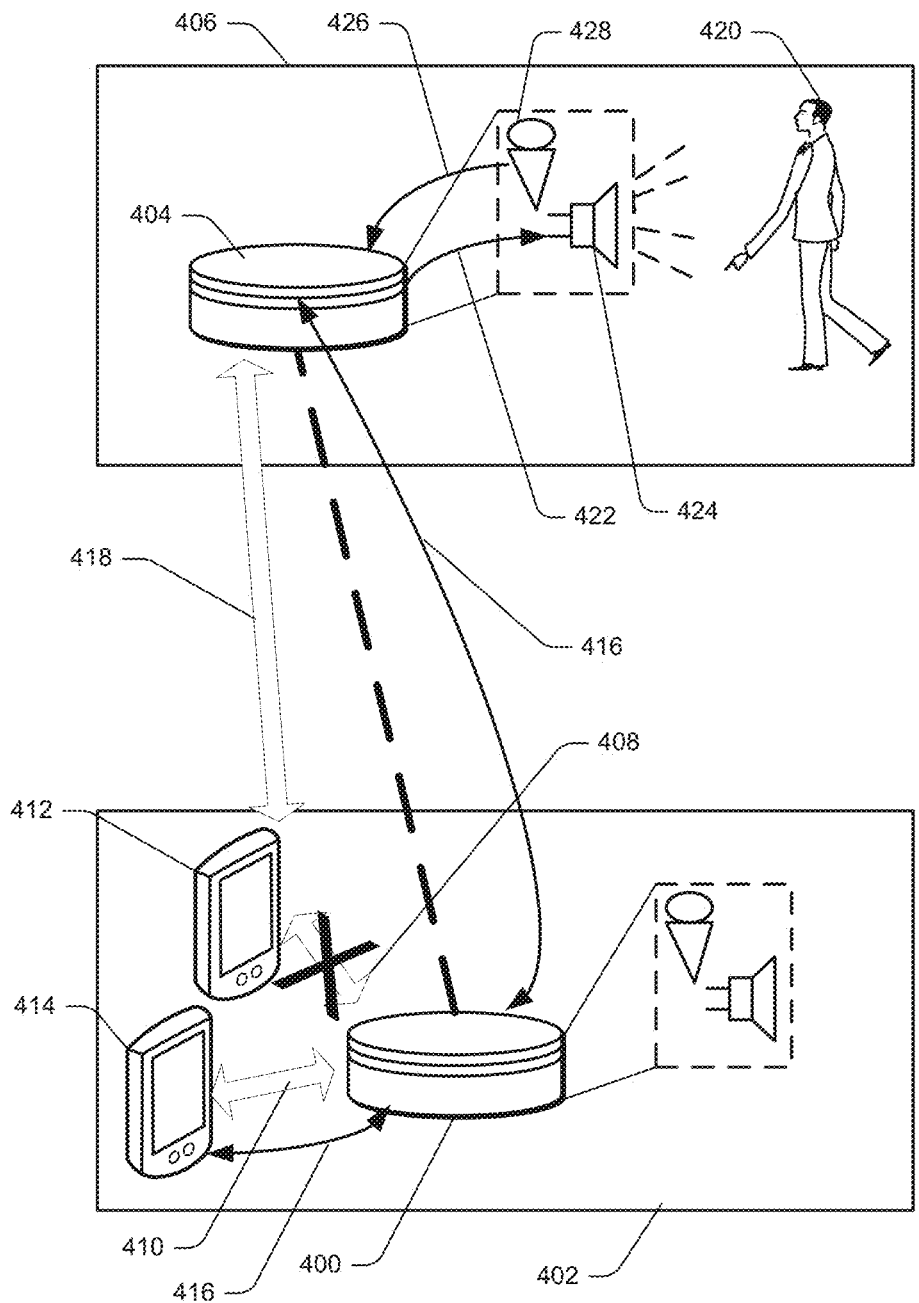
FIG. 4 depicts a block diagram illustrating hands-free decoupling and voice routing between voice-controlled assistants.

FIG. 4 depicts a block diagram illustrating hands-free decoupling and voice routing between voice-controlled assistants. As illustrated in FIG. 4, a first voice-controlled assistant 400 is present in a first area 402, and a second voice-controlled assistant 404 is present in a second area 406. In an initial state, prior to a voice call being received, wireless devices 412 and 414 are bonded with the first voice-controlled assistant 400 in the first room 402, and with control connections 408 and 410 (denoted in FIG. 4 with double arrows) set up between the wireless devices 412 and 414 and the voice-controlled assistant 400.

Upon detecting that the wireless device 414 receives a phone call, such as through the established control connection 410 to the wireless device 414, the voice-controlled assistant 400 establishes an audio communication channel 416 to the wireless device 414 in order to provide hands-free service for the duration of the call. The voice-controlled assistant 400 also decouples or severs the control connection 408 to the wireless device 412 (denoted in FIG. 4 as an "X") in response to setting up the audio communication channel 416 with the wireless device 414. The wireless device 408 is then free to establish a control connection 418 to another hands-free unit, such as the voice-controlled assistant 404. The voice-controlled assistant 404 may inform any other voice-controlled assistants to which it may be communicatively coupled with, such as the voice-controlled assistant 404, that it has an active audio call with the wireless device 414.

A user 420 may be associated with the wireless device 414. The voice-controlled assistant 404 may detect a proximity of the user 420, such as based on location information, voice recognition, face recognition, and so forth. Upon detecting the close proximity of the user 420 to the voice-controlled assistant 404, the voice-controlled assistant 404 informs the voice-controlled assistant 400 of its proximity to the user 420. In response, the voice-controlled assistant may route the audio communication channel 416 to the voice-controlled assistant 404. The voice-controlled assistant 404 then transmits audio data 422 received via the routed audio communication channel 416 to speaker 424. Likewise, the voice controlled assistant 404 routes audio data 426 picked up by microphone 428 to the voice-controlled assistant 400 via the routed audio communication channel 416, which in turn transmits it to the wireless device 414.

CONCLUSION

Although the subject matter has been described in language that is specific to structural features, it is to be understood that the subject matter defined in the appended claims is not necessarily limited to the specific features described. Rather, the specific features are disclosed as illustrative forms of implementing the claims.

What is claimed is:

1. A device comprising:
   at least one microphone;
   one or more processors; and
   non-transitory computer-readable media storing instructions that, when executed by the one or more processors, cause the one or more processors to perform operations comprising:
      receiving audio via the at least one microphone;
      generating audio data based at least in part on the audio;
      determining a portion of the audio data identified as background noise;
      selecting the portion of the audio data to analyze based at least in part on the portion of the audio data being identified as the background noise;
      determining, from a voice recognition analysis performed on the portion of the audio data identified as the background noise, that the portion of the audio data includes user speech, the voice recognition analysis including analyzing first characteristics of the portion of the audio data in association with second characteristics previously analyzed and determined to indicate user speech; and
      determining, based at least in part on the portion of the audio data including the user speech in the background noise, that a user is present with respect to the device.

2. The device of claim 1, the operations further comprising:
   determining at least one characteristic associated with the audio data corresponds to at least one reference characteristic associated with user profile data; and
   determining that the audio data is associated with the user profile data based at least in part on the at least one characteristic corresponding to the at least one reference characteristic.

3. The device of claim 1, the operations further comprising:
   determining a time of day associated with the audio data corresponds to a reference time of day associated with user profile data; and
   determining that the audio data is associated with the user profile data based at least in part on the time of day corresponding to the reference time of day.

4. The device of claim 1, the operations further comprising receiving, from a user device, global-positioning-system data indicating that the user device is present in association with the device, and wherein determining that the user is present comprises determining that the user is present based at least in part on the global-positioning-system data.

5. The device of claim 1, the operations further comprising receiving image data indicating motion in an environment in which the device is disposed, and wherein determining that the user is present comprises determining that the user is present based at least in part on the image data.

6. The device of claim 5, the operations further comprising:
   sending the image data to a remote system;
   receiving, from the remote system, an indication of user profile data associated with the user, the indication based at least in part on facial recognition performed in association with the image data; and
   associating the audio data with the user profile data.

7. The device of claim 1, the operations further comprising determining that the audio data includes a predefined command, and wherein determining that the user is present comprises determining that the user is present based at least in part on determining that the audio data includes a predefined command.

8. The device of claim 1, the operations further comprising:
   sending the audio data to a remote system;
   receiving, from the remote system, a command;
   determining that the command is associated with user profile data; and
   associating the audio data with the user profile data.

9. The device of claim 1, the operations further comprising:
- determining that at least one characteristic associated with the audio data corresponds to at least one reference characteristic associated with user profile data;
- determining a time of day associated with the audio data corresponds to a reference time of day associated with user profile data;
- determining that a command received from a remote system in response to the audio data is associated with the user profile data;
- determining that the audio data is associated with the user profile data based at least in part on at least one of:
  - the at least one characteristic corresponding to the at least one reference characteristic;
  - the time of day corresponding to the reference time of day; or
  - the command being associated with the user profile data;
- receiving, from a user device, global-positioning-system data indicating that the user device is present in association with the device;
- determining that the audio data includes a predefined command;
- determining that the audio data includes background noise; and
- determining that a signal strength associated with the audio data satisfies a threshold signal strength, wherein determining that the user is present comprises determining that the user is present based at least in part on at least one of:
  - the global-positioning-system data;
  - determining that the audio data includes the predefined command;
  - determining that the audio data includes the background noise; or
  - the signal strength satisfying the threshold signal strength.

10. The device of claim 1, wherein determining that the portion of the audio data includes the background noise is based at least in part on comparing the portion of the audio data to previously identified background noise.

11. The device of claim 10, wherein the previously identified background noise comprises reference audio data from at least one of an identified audio file, an identified video, an identified television shows, or an identified cooking sound.

12. A method comprising:
- receiving audio via at least one microphone;
- generating audio data based at least in part on the audio;
- determining that a portion of the audio data includes background noise;
- selecting the portion of the audio data to analyze based at least in part on the portion of the audio data being identified as the background noise;
- determining, from a voice recognition analysis performed on the portion of the audio data identified as the background noise, that the portion of the audio data includes user speech, the voice recognition analysis including analyzing first characteristics of the portion of the audio data in association with second characteristics previously analyzed and determined to indicate user speech; and
- determining, based at least in part on the portion of the audio data including the user speech in the background noise, that a user is present.

13. The method of claim 12, further comprising:
- determining at least one characteristic associated with the audio data corresponds to at least one reference characteristic associated with user profile data; and
- determining that the audio data is associated with the user profile data based at least in part on the at least one characteristic corresponding to the at least one reference characteristic.

14. The method of claim 12, further comprising:
- determining a time of day associated with the audio data corresponds to a reference time of day associated with user profile data; and
- determining that the audio data is associated with the user profile data based at least in part on the time of day corresponding to the reference time of day.

15. The method of claim 12, further comprising determining a signal strength associated with the audio data.

16. The method of claim 15, further comprising:
- determining that the signal strength satisfies a threshold signal strength; and
- determining, based at least in part on the signal strength satisfying the threshold signal strength, that the user is present.

17. The method of claim 12, further comprising receiving image data indicating motion in an environment in which the user is located, and wherein determining that the user is present comprises determining that the user is present based at least in part on the image data.

18. The method of claim 17, further comprising:
- sending the image data to a remote system;
- receiving, from the remote system, an indication of user profile data associated with the user, the indication based at least in part on facial recognition performed in association with the image data; and
- associating the audio data with the user profile data.

19. The method of claim 12, further comprising determining that the audio data includes a predefined command, and wherein determining that the user is present comprises determining that the user is present based at least in part on determining that the audio data includes a predefined command.

20. The method of claim 12, further comprising:
- sending the audio data to a remote system;
- receiving, from the remote system, a command;
- determining that the command is associated with user profile data; and
- associating the audio data with the user profile data.

* * * * *